(12) United States Patent
Hsi et al.

(10) Patent No.: US 8,571,950 B2
(45) Date of Patent: Oct. 29, 2013

(54) BILLING BASED ON EQUIVALENT QUALITY OF SERVICE UNITS

(75) Inventors: Teh-Li Hsi, Florham Park, NJ (US);
Albert J. Sawyer, Wheaton, IL (US);
Chokri Trabelsi, Bridgewater, NJ (US);
Yang Yang, Morris Plains, NJ (US)

(73) Assignee: Alcatel Lucent, Paris (FR)

( * ) Notice: Subject to any disclaimer, the term of this patent is extended or adjusted under 35 U.S.C. 154(b) by 1086 days.

(21) Appl. No.: 11/691,281

(22) Filed: Mar. 26, 2007

(65) Prior Publication Data
US 2008/0243653 A1  Oct. 2, 2008

(51) Int. Cl.
*G07F 19/00* (2006.01)
*H04M 15/00* (2006.01)

(52) U.S. Cl.
USPC .......................................... 705/34; 705/412

(58) Field of Classification Search
USPC .......... 455/405; 705/37, 40, 400, 412, 1, 2, 3, 705/8, 14, 26, 35, 16, 28, 34; 713/168, 193; 726/7; 709/200, 217, 219, 223, 227, 709/230; 370/314, 315, 316, 337, 468, 266, 370/321, 322, 328
See application file for complete search history.

(56) References Cited

U.S. PATENT DOCUMENTS 5,812,545 A * 9/1998 Liebowitz et al. ............ 370/337

OTHER PUBLICATIONS

Communication relating to the results of the International Search Report from counterpart International Application No. PCT/US2008/03670 Oct. 22, 2008.
Written Opinion dated Oct. 22, 2008.

* cited by examiner

*Primary Examiner* — Scott Zare
*Assistant Examiner* — Rokib Masud
(74) *Attorney, Agent, or Firm* — Williams, Morgan & Amerson

(57) ABSTRACT

The present invention provides a method that may be used for billing for quality of service applications. The method includes determining at least one parameter indicative of resource usage of at least one first quality of service application by comparing at least one resource used by the first quality of service application(s) to at least one resource used by a second quality of service application. The method also includes providing information indicative of at least one cost associated with the first quality of service application(s) based on the comparison and at least one cost associated with the second quality of service application.

12 Claims, 3 Drawing Sheets

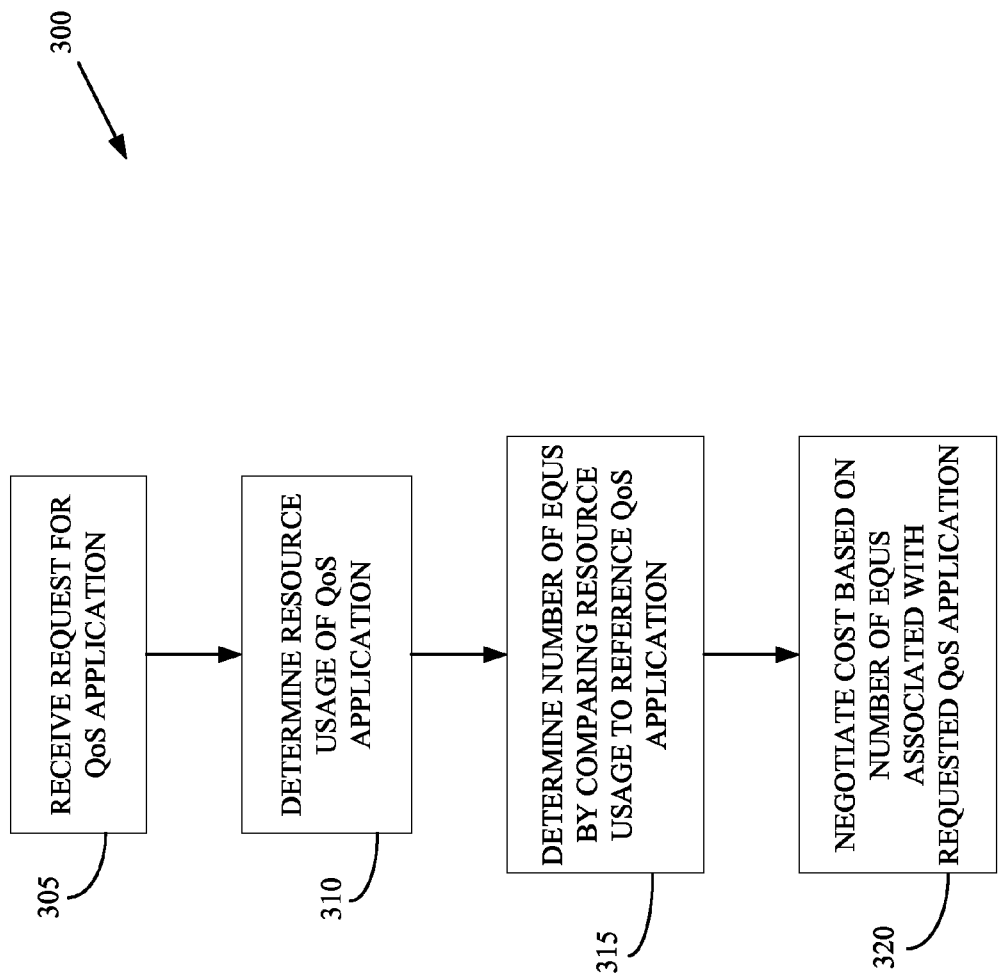

BILLING BASED ON EQUIVALENT QUALITY OF SERVICE UNITS

BACKGROUND OF THE INVENTION

1. Field of the Invention

This invention relates generally to communication systems, and, more particularly, to wireless communication systems.

2. Description of the Related Art

Conventional wireless communication systems include numerous base stations that provide wireless connectivity to geographic areas that are commonly referred to as cells. Wireless connectivity may also be provided by access points, access networks, base station routers, and the like. Users access the wireless communication system using mobile units such as cellular telephones, personal data assistants, smart phones, pagers, text messaging devices, network interface cards, notebook computers, desktop computers and the like. For example, a user may initiate a call from a cellular telephone, which may establish a wireless communication link over and air interface between the telephone and one or more base stations that provide wireless connectivity to the cell containing the telephone. For another example, the user may subscribe to a multicast service (e.g., pay-per-view television) and the network may initiate a communication session with the user's mobile unit to provide the multicast service to the user.

Users are typically charged for the services provided by the conventional wireless communication system based on time and/or throughput associated with the services provided to the user's mobile unit. For example, users of cellular telephones are billed for the total duration of calls received by and/or placed by the user. The total call duration is often referred to as airtime usage. For another example, users of a multicast service such as streaming video and/or music or data services such as Internet access and/or e-mail may also be billed based upon the total data throughput required to provide these services. Some service providers offer service plans that allow a user access to unlimited minutes of airtime and/or unlimited data throughput. However, the rates for these "unlimited" service plans are based upon statistical estimates of the total airtime and/or data throughput that are expected for a typical user. Thus, the cash flow received by a service provider for each service is directly connected to the number of users that utilize the service, as well as how much of the service they use.

Service providers are beginning to offer applications and/or services that insure a particular Quality of Service (QoS) for the provided application. Call control and management for quality of service applications is significantly more complicated than regular packet data services that implement best-effort performance. For example, the service provider must guarantee certain levels of throughput, latency, jitter and loss in the packet stream provided by the application to insure a particular quality of service level for the end user. Furthermore, the guaranteed levels of throughput, latency, jitter and loss are different for each quality of service level and each application. Different quality of service applications may therefore consume different amounts of network resources, depending on the type of application, the number of users, and the quality of service levels requested by the users. For example, a user who requests a relatively high quality of service for an application such as video and/or audio streaming may require a relatively large proportion of network resources, such as time slots and/or radiofrequency power, to insure that the video and/or audio stream is received at the requested quality of service level. Similarly, a user who requests a relatively low quality of service for the audio and/or video streaming application may require a relatively smaller proportion of the network resources to achieve the relatively low quality of service.

Although service providers generally believe that quality of service applications should eventually be able to generate a large amount of revenue, the actual popularity of these services is not known. Consequently, service providers are not able to reliably predict demand for different quality of service applications and may therefore be unwilling to invest large amounts of capital to implement quality of service applications. Instead, service providers may prefer to adopt a "pay-as-you-grow" approach that enables them to increase capacity in response to demand for particular quality of service applications. In a conventional pay-as-you-grow approach, vendors provide hardware, firmware, and/or software that permit a selected airtime usage and/or data throughput for a given cost. Service providers may elect to pay more or less if the actual airtime usage and/or data throughput increases or decreases. For example, if the service provider has a license from a vendor that permits a data throughput of 10 kbps, but actual demand approaches or exceeds this level, the service provider may elect to pay more for a license that permits a data throughput of 20 kbps. However, vendors and/or service providers may not be able to implement a pay-as-you-grow approach for quality of service applications because the variability of resource usage for quality of service applications across multiple dimensions of resource demands (e.g., throughput, latency, jitter and loss) precludes a simplistic model of multiplicity based on throughput. Vendors and service providers may therefore not be able to reliably estimate a reasonable cost for different quality of service applications and levels.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for billing for quality of service applications. The method includes determining at least one parameter indicative of resource usage of at least one first quality of service application by comparing at least one resource used by the first quality of service application(s) to at least one resource used by a second quality of service application. The method also includes providing information indicative of at least one cost associated with the first quality of service application(s) based on the comparison and at least one cost associated with the second quality of service application.

BRIEF DESCRIPTION OF THE DRAWINGS

The invention may be understood by reference to the following description taken in conjunction with the accompanying drawings, in which like reference numerals identify like elements, and in which:

FIG. 3 conceptually illustrates one exemplary embodiment of a method of negotiating costs for a quality of service application, in accordance with the present invention.

Figure 1:
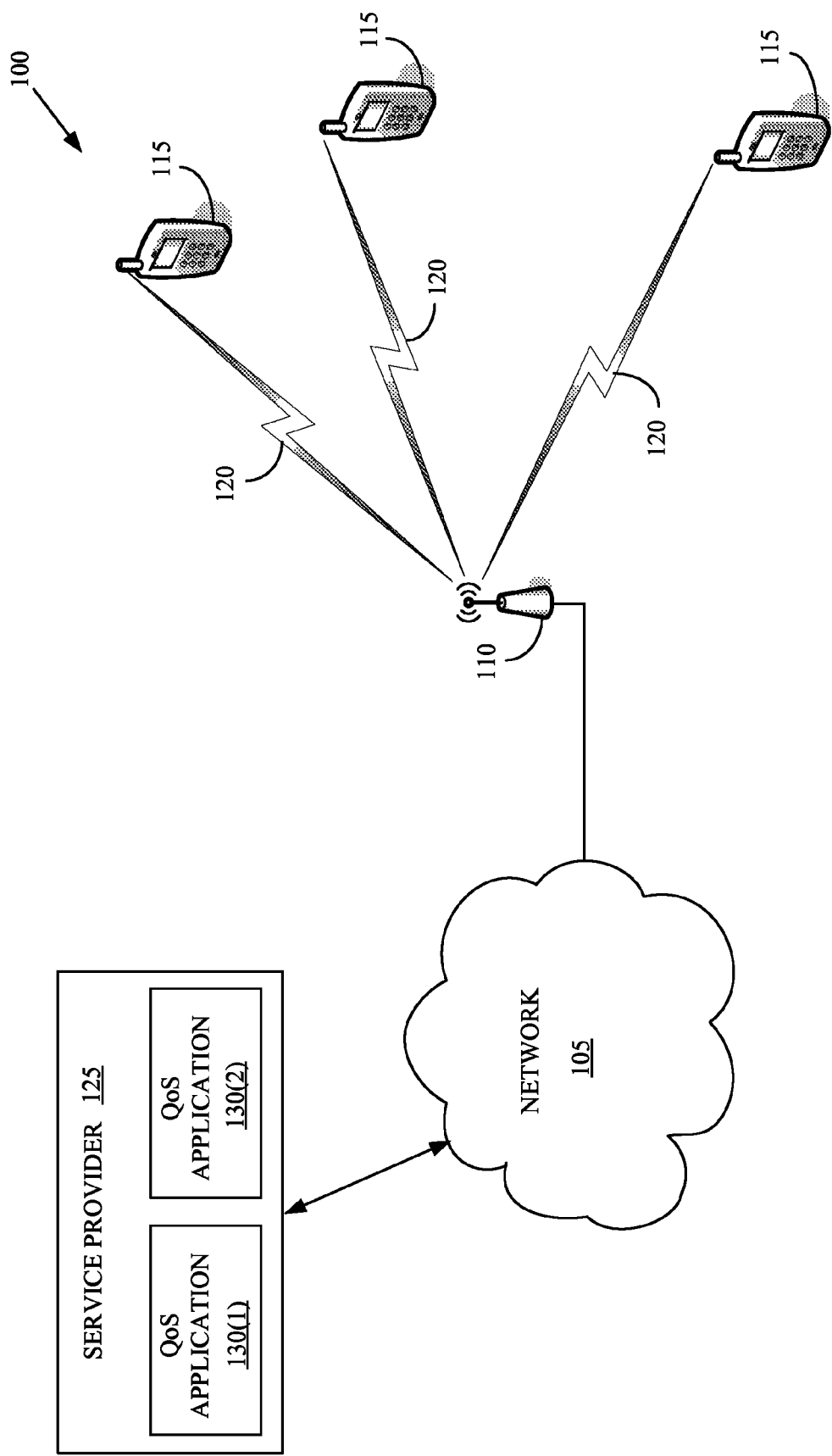
FIG. 1 conceptually illustrates one exemplary embodiment of a communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a communication system 100. In the illustrated embodiment, the communication system includes a network 105 that is communicatively coupled to a base station 110. The network 105 may operate according to wired standards and/or protocols, wireless standards and/or protocols, or any combination thereof. The standards and/or protocols that are used to implement the network 105 are matters of design choice and not material to the present invention. The base station 110 is used to provide wireless connectivity and the wireless communication system 100 may include any number of the base stations 110. However, the present invention is not limited to communication systems 100 that include base stations 110. In alternative embodiments, any device may be used to provide wireless connectivity. For example, the communication system 100 may include access points, access networks, base station routers, and the like for providing wireless connectivity. Furthermore, the communication system 100 may also provide wired connectivity to end-users.

One or more mobile units 115 may access the communication system 100 using the base station 110 and the network 105. In the illustrated embodiment, the mobile units 115 establish communication links 120 over an air interface with the base station 110. The mobile units 115 and the base station 110 may then exchange information, including voice and/or data information, over the communication links 120. Techniques for establishing and/or operating the communication links 120 are known in the art and in the interest of clarity only those aspects of establishing and/or operating the communication links 120 that are relevant to the present invention will be discussed herein.

A service provider 125 may provide various services to the mobile units 115 via the network 105. Services that may be provided by the service provider 125 include, but are not limited to, digital and/or analog voice transmissions, data transmissions, broadcasts, and multicasts. For example, the services may include voice over Internet Protocol (VoIP) service, Video Telephony service, Push-to-Talk service, video/audio mail service, multi-media streaming service, and the like. The video services generally allow different throughput levels and VoIP/PTT services generally allow different delay tolerance levels. Some of the services provided by the service provider 125 are quality of service (QoS) applications 130(1-2). Although the service provider 125 depicted in FIG. 1 is shown as supporting two quality of service applications 130(1-2), persons of ordinary skill in the art having benefit of the present disclosure should appreciate that this is only one example and in alternative embodiments the service provider 125 may provide any number of quality of service applications 130(1-2). Furthermore, the service provider 125 may also provide other applications (not shown) that do not support quality of service.

As used herein and in accordance with common usage in the art, the term "quality of service application" will be understood to refer to an application that may be used to provide a service at one or more quality of service levels. Quality of service applications 130(1-2) are able to insure, within a selected tolerance, that the user of the mobile unit 130(1-2) that receives the service provided by the quality of service application perceives the preselected quality of service level in the voice and/or data signals that are provided to the mobile unit 130(1-2) used by the user. For example, if the user selects a relatively high quality of service level, which requires relatively high throughput, relatively low latency, relatively low jitter, and relatively low loss of packets, the quality of service application should be able to insure that these requirements are met a selected percentage of the time, e.g., 99% of the time and/or for 99% of the packets that are delivered to the mobile unit. Consequently, the user should perceive a relatively high quality to the service associated with the voice and/or data signals. For example, the reproduction of the original voice that is formed using the voice signals should sound realistic and the user should not hear gaps or distortions.

The quality of service applications 130 may provide different services at different quality of service levels. Accordingly, the quality of service applications 130 may consume different amounts of network resources. Furthermore, the resource usage of a single quality of service application 130 may vary depending on the quality of service levels that are being used by the quality of service application 130 to provide services to one or more of the mobile units 115. For example, the service provider 125 guarantees certain levels of throughput, latency, jitter, loss, and/or other characteristics of a packet stream provided by the quality of service application 130 to insure a particular quality of service level for the end user. The resource usage of the quality of service applications 130 may therefore depend upon on the type of application, the number of users, and the quality of service levels requested by the users, as well as the resources that may be used to maintain the desired levels of throughput, latency, jitter, loss, and/or other characteristics.

The network 105 and/or the service provider 125 may determine a parameter that indicates the relative amount of resource usage for the quality of service applications 130, as well as the quality of service levels support by the quality of service applications 130. This parameter will be referred to herein as an equivalent QoS unit (EQU) although persons of ordinary skill in the art having benefit of the present disclosure should appreciate that alternative terms may also be used to describe this type of parameter. The EQU may be determined by comparing the resource usage of one quality of service application 130(1) to the resource usage of a reference quality of service application 130(2), as will be discussed in detail below. Costs associated with purchasing, installing, and/or supporting the quality of service applications 130 may be negotiated using the EQU associated with each quality of service application 130 and/or each quality of service level provided by the quality of service application 130. For example, the service provider 125 may negotiate the cost of implementing a quality of service application 130 (and/or expanding the number of users, services, and/or quality of service levels supported by the quality of service application 130) with a vendor that supplies the hardware, firmware, and/or software that is used to implement the quality of service applications 130

Figure 2:
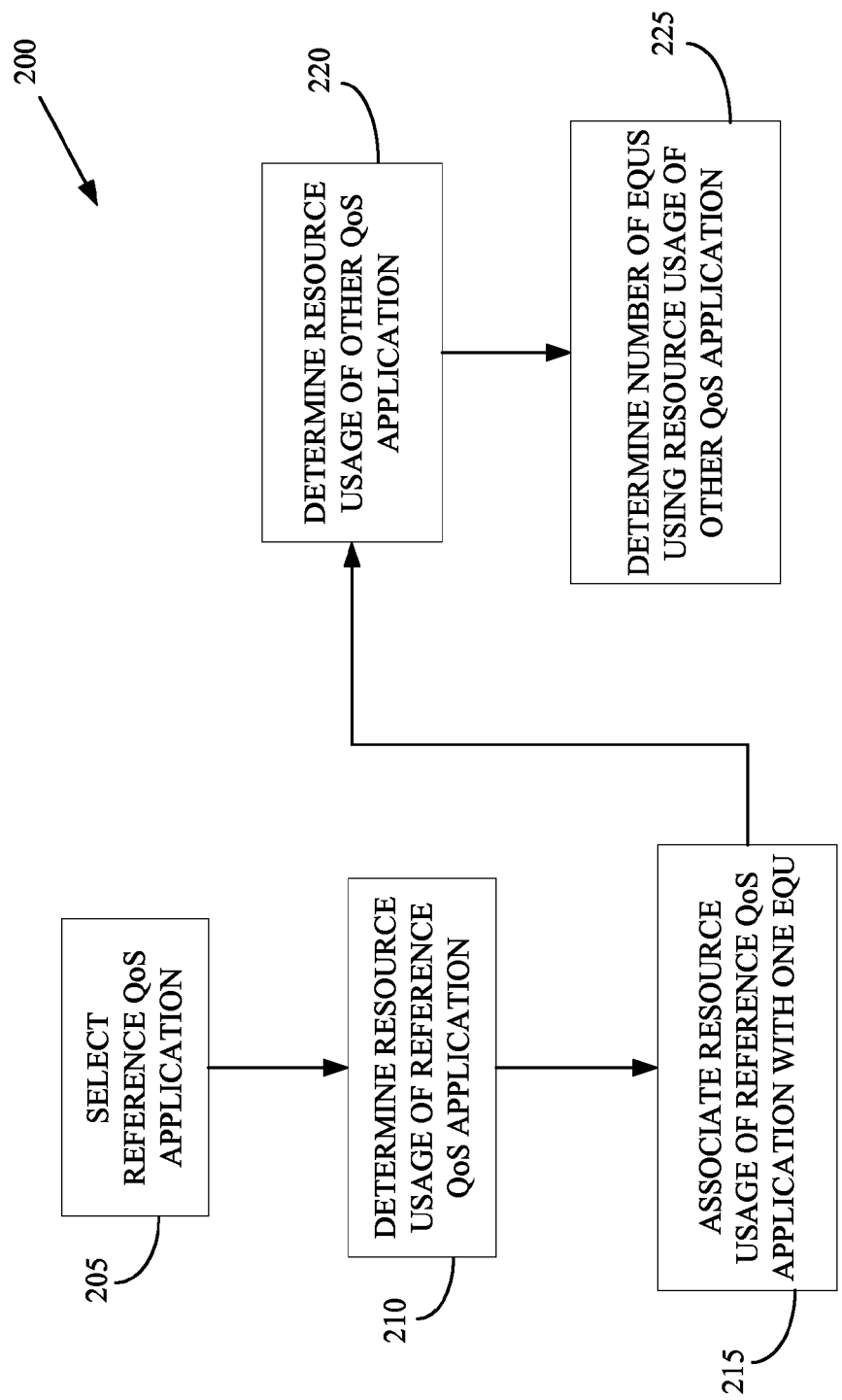
FIG. 2 conceptually illustrates one exemplary embodiment of a method of determining an equivalent QoS unit, in accordance with the present invention.

FIG. 2 conceptually illustrates one exemplary embodiment of a method 200 of determining an equivalent QoS unit for an application. In the illustrated embodiment, one quality of service application is selected (at 205) as a reference quality of service application. For example, a voice over Internet protocol (VoIP) application could be selected (at 205) as the reference quality of service application. The resource usage of the reference application is then determined (at 210). For example, the resources utilized by the reference quality of service application to support a VoIP for one or more users (while maintaining selected levels of throughput, latency, jitter, packet loss, and/or other parameters) may be determined (at 210). In some embodiments, the resource usage of the reference quality of service application is determined for a selected quality of service level. The resource usage may be determined (at 210) using measurements, empirical relations, theoretical relations, modeling, or any combination thereof. The determined resource usage of the reference quality of service application may then be associated (at 215) with one equivalent QoS unit (EQU).

The resource usage of one or more other quality of service applications may then be determined (at 220). For example, the resources utilized to support a video conferencing QoS application for one or more users (while maintaining selected levels of throughput, latency, jitter, packet loss, and/or other parameters) may be determined (at 220). In some embodiments, the resource usage of the other quality of service application(s) may be determined for a selected quality of service level. The resource usage may be determined (at 220) using measurements, empirical relations, theoretical relations, modeling, or any combination thereof. A number of equivalent QoS units associated with the other quality of service applications may then be determined (at 225) by comparison with the resource usage of the reference quality of service application. For example, if a quality of service application requires approximately 5 times the radiofrequency resources as the reference quality of service application, then the quality of service application may be associated with five equivalent QoS units. In various alternative embodiments, the relative number of equivalent QoS units associated with different quality of service applications may be determined (at 225) using ratios of particular radiofrequency resources, models and/or functional relationships between the radiofrequency resources, and the like. The determined (at 225) equivalent QoS units may therefore account for variability across the multiple dimensions of resource demands, such as throughput, latency, jitter and loss, FIG. 3 conceptually illustrates one exemplary embodiment of a method 300 of negotiating costs for a quality of service application. In the illustrated embodiment, a request (e.g., from a service provider) to implement a quality of service application is received (at 305) by a vendor that provides the quality of service application. The request may include a request to purchase hardware, firmware, and/or software that may be used to support one or more quality of service applications for a selected number of users and a selected number of quality of service levels. Alternatively, the service provider may already have implemented the quality of service application and in this case the request may include a request to modify the hardware, firmware, and/or software to support more (or fewer) quality of service applications for more (or fewer) users and more (or fewer) quality of service levels. The vendor may then determine (at 310) the resource usage that may be required to implement the requested quality of service application(s) for the requested number of users and/or number of quality of service levels.

The number of equivalent QoS units associated with the requested quality of service application, the requested number of users, and/or the requested quality of service levels may then be determined (at 315). In one embodiment, the number of equivalent QoS units is determined (at 315) by comparing the resource usage of the requested quality of service application to the resource usage of a reference quality of service application, as discussed herein. The cost of implementing and/or modifying the requested quality of service application may then be negotiated (at 320) based on the number of equivalent QoS units associated with the requested quality of service application. For example, the total chargeable number of equivalent QoS units for the requested quality of service application may be determined by summing the number of equivalent QoS units needed to support the quality of service application for the requested number of users and/or quality of service levels, as well as summing over all of the requested quality of service applications to be supported by the service provider. The vendor and the service provider may then negotiate (at 320) a cost per equivalent QoS unit, e.g., based upon previously negotiated costs per equivalent QoS unit for other quality of service applications.

Embodiments of the techniques described herein have a number of advantages over conventional charging techniques based upon overall throughput and/or time. For example, using the equivalent QoS unit as the basis for negotiating the cost associated with one or more quality of service applications allows vendors to support an incremental sales model, such as a pay-as-you-grow sales model. Furthermore, service providers may purchase equivalent QoS units, which may provide the service provider with the flexibility to offer different QoS services within the capacity purchased. In addition, different QoS applications require different network resources and charging system based on the equivalent QoS unit permits differentiation of the QoS applications in the charging system. Thus, embodiments of the techniques described herein provide a unified QoS application charging criterion that is flexible and scalable for diversified QoS applications. The techniques described herein may also permit service providers to roll out the QoS applications according to the pay-as-you-grow methodology.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method for implementation in a wireless communication system and, comprising:
    calculating, in the wireless communication system, resource usage of a reference application in meeting a reference quality-of-service (QoS) during wireless communication in the wireless communication system;
    setting a reference billing rate based on the resource usage of the reference application in meeting the reference QoS;
    calculating, in the wireless communication system, resource usage of a target application in meeting a target QoS during wireless communication in the wireless communication system; and
    setting a target billing rate using a processor for the resource usage of the target application in meeting the target QoS based on the reference billing rate and a ratio of the resource usage of the target application to the resource usage of the reference application.

2. The method of claim 1, wherein calculating the resource usage of the reference application comprises calculating the resource usage of the reference application using at least one of a measurement, an empirical relation, a theoretical relation, or a model.

3. The method of claim 1, wherein setting the reference billing rate for the resource usage of the reference application comprises negotiating, in the wireless communication system, the reference billing rate with at least one of a vendor or a service provider.

4. The method of claim 1, wherein calculating the resource usage of the target application comprises calculating the resource usage of the target application using at least one of a ratio of the resource usage of the reference application to the resource usage of the target application, a model or a functional relationship that determines the resource usage of the target application based on the resource usage of the reference application.

5. The method of claim 1, wherein setting the reference billing rate comprises setting an equivalent billing unit equal to the resource usage of the reference application in meeting the reference QoS.

6. The method of claim 5, wherein setting the reference billing rate comprises setting a billing rate per equivalent billing unit.

7. The method of claim 6, comprising determining the ratio of the resource usage of the target application to the resource usage of the reference application.

8. The method of claim 7, wherein setting the target billing rate for the resource usage of the target application in meeting the target QoS comprises determining a number of equivalent billing units that is equal to a ratio of the resource usage of the target application in meeting the target QoS to the resource usage of the reference application in meeting the reference QoS.

9. The method of claim 8, wherein setting the target billing rate comprises setting the target billing rate equal to the reference billing rate multiplied by the number of equivalent billing units.

10. The method of claim 1, comprising receiving, in the wireless communication system, a request to implement the target application at the target QoS.

11. The method of claim 10, wherein calculating the resource usage of the target application in meeting the target QoS comprises calculating the resource usage of the target application in meeting the target QoS in response to receiving the request to implement the target application at the target QoS.

12. The method of claim 11, comprising implementing, in the wireless communication system, the target application at the target QoS at the target billing rate.

* * * * *